(12) United States Patent
Kotake

(10) Patent No.: US 9,317,618 B2
(45) Date of Patent: Apr. 19, 2016

(54) COMMUNICATION DEVICE AND METHOD OF DISPLAYING CONTENT TITLES

(75) Inventor: Kanako Kotake, Aichi (JP)

(73) Assignee: BROTHER KOGYO KABUSHIKI KAISHA, Nagoya, Aichi (JP)

(*) Notice: Subject to any disclaimer, the term of this patent is extended or adjusted under 35 U.S.C. 154(b) by 561 days.

(21) Appl. No.: 12/570,479

(22) Filed: Sep. 30, 2009

(65) Prior Publication Data

US 2010/0088329 A1   Apr. 8, 2010

(30) Foreign Application Priority Data

Oct. 2, 2008   (JP) .................................. 2008-257296

(51) Int. Cl.
   *G06F 17/30* (2006.01)
(52) U.S. Cl.
   CPC ................. *G06F 17/30876* (2013.01)
(58) Field of Classification Search
   CPC ................................................. G06F 17/30876
   USPC .................................... 707/736, 748, 749, 751
   See application file for complete search history.

(56) References Cited

U.S. PATENT DOCUMENTS

| | | | |
|---|---|---|---|
| 2003/0093795 A1* | 5/2003 | Takahashi et al. | 725/49 |
| 2003/0167467 A1* | 9/2003 | Allen et al. | 725/47 |
| 2003/0214667 A1 | 11/2003 | Ishikura et al. | |
| 2005/0021997 A1* | 1/2005 | Beynon et al. | 713/200 |
| 2005/0108756 A1* | 5/2005 | Nishikawa et al. | 725/47 |
| 2006/0073812 A1* | 4/2006 | Punaganti Venkata et al. | 455/412.1 |
| 2007/0174298 A1 | 7/2007 | Tanimoto | |
| 2008/0165209 A1 | 7/2008 | Kondo et al. | |
| 2009/0118998 A1* | 5/2009 | Chau et al. | 701/120 |
| 2009/0144259 A1* | 6/2009 | Sundaresan | 707/5 |
| 2009/0157205 A1* | 6/2009 | Inoue et al. | 700/94 |
| 2010/0042749 A1* | 2/2010 | Barton | 710/1 |

FOREIGN PATENT DOCUMENTS

| | | |
|---|---|---|
| JP | 5-67009 | 3/1993 |
| JP | 2000-101947 | 4/2000 |

(Continued)

OTHER PUBLICATIONS

Japanese Official Action dated Nov. 2, 2010 together with an English language translation.

(Continued)

*Primary Examiner* — Grace Park
(74) *Attorney, Agent, or Firm* — Scully, Scott, Murphy & Presser, P.C.

(57) ABSTRACT

A communication device is configured to access, based on summary location data, content summary data, which includes at least titles of a plurality of pieces of content, location data representing locations of the plurality of pieces of content and description data representing a part of each of the plurality of pieces of content. A first memory stores a plurality of pieces of storing summary data, and a second memory stores a predetermined number of pieces of storing summary data selected from among the plurality of pieces of storing summary data stored in the first memory. A first display unit displays the predetermined number of pieces of storing summary data in a list and in a scrolled manner. A transmission unit transmits the content location data included in the storing summary data corresponding to the selected title to a data display device that is communicably connected with the communication device.

12 Claims, 12 Drawing Sheets

(56) References Cited

FOREIGN PATENT DOCUMENTS

| | | |
|---|---|---|
| JP | 2000-270312 | 9/2000 |
| JP | 2000-285134 | 10/2000 |
| JP | 2002-334037 | 11/2002 |
| JP | 2003-338897 | 11/2003 |
| JP | 2004-287890 | 10/2004 |
| JP | 2005-31867 | 2/2005 |
| JP | 2005-284454 | 10/2005 |
| JP | 2007-199998 | 8/2007 |
| JP | 2008-26439 | 2/2008 |
| JP | 2008-158813 | 7/2008 |
| JP | 2008-165692 | 7/2008 |
| JP | 2008-188822 | 8/2008 |
| JP | 2008-225791 | 9/2008 |
| JP | 2008-226204 | 9/2008 |

OTHER PUBLICATIONS

Nikkei-Network, Japan, Nikkei Business Publication, Inc., Oct. 22, 2005, 67$^{th}$ edition, p. 68-p. 72, together with a partial English-translation.

Japanese Office Action dated Aug. 3, 2010.

\* cited by examiner

| MEMORY NUMBER | COORDINATES |
|---|---|
| M0 | COORDINATES OF DATA DISPLAY AREA 200 |
| M1 | COORDINATES OF DATA DISPLAY AREA 201 |
| M2 | COORDINATES OF DATA DISPLAY AREA 202 |
| M3 | COORDINATES OF DATA DISPLAY AREA 203 |
| M4 | COORDINATES OF DATA DISPLAY AREA 204 |
| M5 | COORDINATES OF TRASH BOX BUTTON 212 |
| M6 | COORDINATES OF BATCH TRANSMISSION BUTTON 214 |

FIG. 3

URL STORAGE AREA

| i | URL |
|---|---|
| 0 | http://www.example0.com |
| 1 | http://www.example1.com |
| 2 | http://www.example2.com |
| ⋮ | ⋮ |
| n − 1 | http://www.examplen-1.com |

ID Number(100)="0"

| ASAHI | | | | | |
|---|---|---|---|---|---|
| ID NUMBER | TITLE CHARACTER STRING | CATEGORY | DESCRIPTION | CONTENT UPDATE TIME DATA | SITE URL | CONTENT URL |
| 0 | TITLE TA1 | POLITICS | DESCRIPTION DA1 | 10:50 | URL0 | URL-A1 |
| 1 | TITLE TA2 | SPORTS | DESCRIPTION DA2 | 10:30 | URL0 | URL-A2 |
| 2 | TITLE TA3 | SOCIAL | DESCRIPTION DA3 | 10:15 | URL0 | URL-A3 |
| 3 | TITLE TA4 | ECONOMY | DESCRIPTION DA4 | 10:00 | URL0 | URL-A4 |
| 4 | TITLE TA5 | GLOBAL | DESCRIPTION DA5 | 10:00 | URL0 | URL-A5 |

ID Number(100)="1"

| NIKKEI | | | | | |
|---|---|---|---|---|---|
| ID NUMBER | TITLE CHARACTER STRING | CATEGORY | DESCRIPTION | CONTENT UPDATE TIME DATA | SITE URL | CONTENT URL |
| 0 | TITLE TN1 | ECONOMY | DESCRIPTION DN1 | 10:40 | URL1 | URL-N1 |
| 1 | TITLE TN2 | ECONOMY | DESCRIPTION DN2 | 10:35 | URL1 | URL-N2 |
| 2 | TITLE TN3 | POLITICS | DESCRIPTION DN3 | 10:15 | URL1 | URL-N3 |
| 3 | TITLE TN4 | SPORTS | DESCRIPTION DN4 | 10:15 | URL1 | URL-N4 |
| 4 | TITLE TN5 | ECONOMY | DESCRIPTION DN5 | 10:10 | URL1 | URL-N5 |

ID Number(100)="2"

| CHUNICHI | | | | | |
|---|---|---|---|---|---|
| ID NUMBER | TITLE CHARACTER STRING | CATEGORY | DESCRIPTION | CONTENT UPDATE TIME DATA | SITE URL | CONTENT URL |
| 0 | TITLE TC1 | SOCIAL | DESCRIPTION DC1 | 10:50 | URL2 | URL-C1 |
| 1 | TITLE TC2 | SPORTS | DESCRIPTION DC2 | 10:30 | URL2 | URL-C2 |
| 2 | TITLE TC3 | GLOBAL | DESCRIPTION DC3 | 10:15 | URL2 | URL-C3 |
| 3 | TITLE TC4 | SOCIAL | DESCRIPTION DC4 | 10:00 | URL2 | URL-C4 |
| 4 | TITLE TC5 | SPORTS | DESCRIPTION DC5 | 10:00 | URL2 | URL-C5 |

FIG.10

| ID NUMBER | TITLE CHARACTER STRING | CATEGORY | DESCRIPTION | CONTENT UPDATE TIME DATA | SITE URL | CONTENT URL |
|---|---|---|---|---|---|---|
| M0 | TITLE TA1 | POLITICS | DESCRIPTION DA1 | 10:50 | URL0 | URL-A1 |
| M1 | TITLE TA2 | SPORTS | DESCRIPTION DA2 | 10:30 | URL0 | URL-A2 |
| M2 | TITLE TA3 | SOCIAL | DESCRIPTION DA3 | 10:15 | URL0 | URL-A3 |
| M3 | TITLE TA4 | SOCIAL | DESCRIPTION DA4 | 10:15 | URL1 | URL-A4 |
| M4 | TITLE TA5 | ECONOMY | DESCRIPTION DA5 | 10:10 | URL1 | URL-A5 |

COMMUNICATION DEVICE AND METHOD OF DISPLAYING CONTENT TITLES

CROSS-REFERENCE TO RELATED APPLICATION

This application claims priority under 35 U.S.C. §119 from Japanese Patent Application No. 2008-257296 filed on Oct. 2, 2008. The entire subject matter of the application is incorporated herein by reference.

BACKGROUND

1. Technical Field

The following description relates to a communication device configured to display titles of content laid open on a network.

2. Prior Art

Various kinds of content are laid open on a network (e.g., the Internet). Further, there is known a server which lays open content summary information including URLs and titles of the content (hereinafter, also referred to as content titles). As an example of such content summary information, there is known Feed information. RSS (Resource Description Framework) and Atom are typically used as a format of such content summary information.

For example, there is known a system which is configured to obtain RSS feed data (including images of articles) from multiple RSS servers and then display the titles of the articles in a list. According to the prior art, when a user selects one of the titles in the displayed list, the system typically displays the title of the article, a body (i.e., description), images and link buttons to web pages. When the user select one of the link buttons (i.e., when the user clicks one of the title), the system obtains the web page data related to the link button, and displays a web page represented by the obtained web page data.

SUMMARY OF THE INVENTION

If the system employs a display device that has a relatively small display area and is unable to display the entire content of the description, only a part of the description is displayed on the display. In such a case, it is difficult for a user to determine whether the description relates to what the user looking for. Thus, the user is required to perform troublesome operations (e.g., repeatedly selects the titles to browse respective web pages) in order to find the desired information.

Aspects of the invention are advantageous in that an improved communication device and method of displaying content titles are provided with which the above-described deficiency of the conventional devices can be resolved.

According to aspects of the invention, there is provided a communication device configured to access, based on summary location data, content summary data, which includes at least titles of a plurality of pieces of content, location data representing locations of the plurality of pieces of content and description data representing a part of each of the plurality of pieces of content. The communication device is provided with a first memory, a first storage control unit configured to obtain a plurality of pieces of content summary data based on the summary location data, generate a plurality of pieces of storing summary data based on the plurality of pieces of content summary data so as to include at least part of the respective pieces of content summary data, and store the plurality of pieces of storing summary data in the first memory, a second memory, a second storage control unit configured to select a predetermined number of pieces of storing summary data from among the plurality of pieces of storing summary data stored in the first memory and store the selected predetermined number of pieces of storing summary data in the second memory, a first display unit configured to display the titles of the predetermined number of pieces of storing summary data stored in the second memory on the display unit provided to the communication device in a list, and executes a scroll display of the description data included in each of the plurality of number of pieces of storing summary data, and a transmission unit configured to transmit the content location data included in the storing summary data corresponding to the selected title to a data display device that is communicably connected with the communication device.

BRIEF DESCRIPTION OF THE ACCOMPANYING DRAWINGS

FIG. 1 schematically shows a multifunction system according to aspects of the invention.

FIG. 3 shows an example of a coordinate information table according to aspects of the invention.

FIG. 4 shows a data structure of a URL storage area according to aspects of the invention.

FIG. 9 schematically shows an example of stored data in the US memory.

FIG. 10 schematically shows an example of stored data in the work memory.

Figure 11:
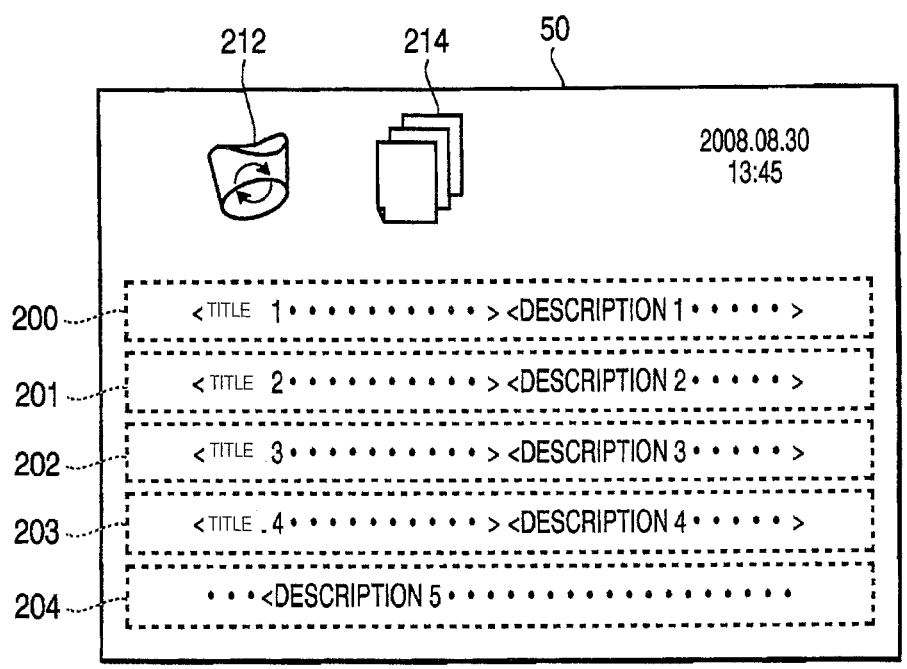

FIG. 11 is an example of a display which is displayed on a display panel.

Figure 12:
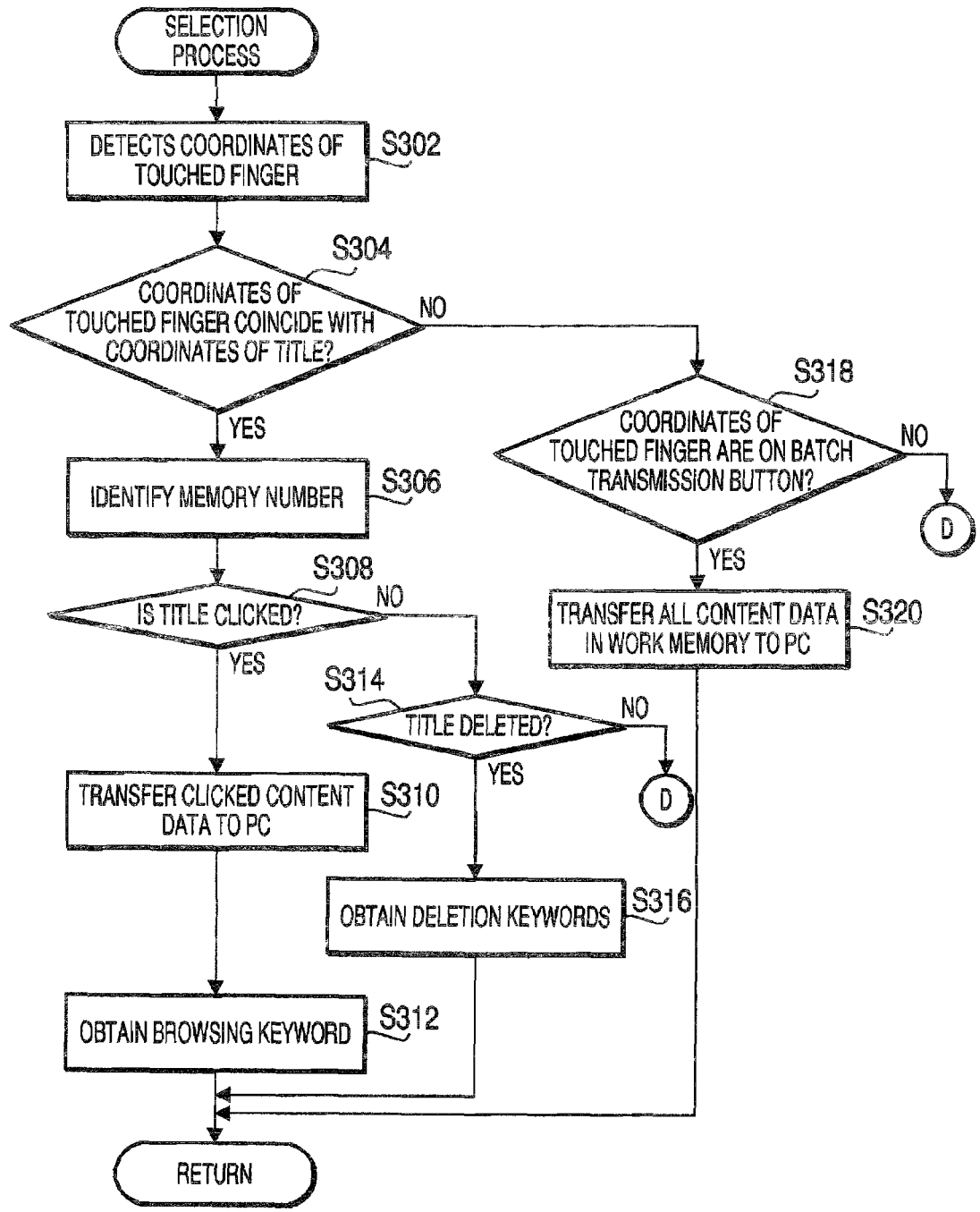

FIG. 12 is a flowchart illustrating a selection process according to aspects of the invention.

Figure 13:
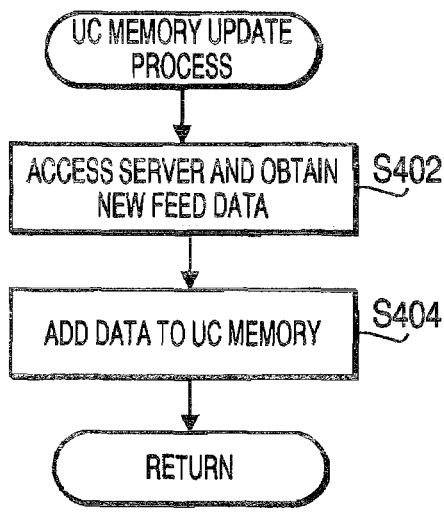

FIG. 13 is a flowchart illustrating a UC memory updating process executed by the MFD.

Figure 14:
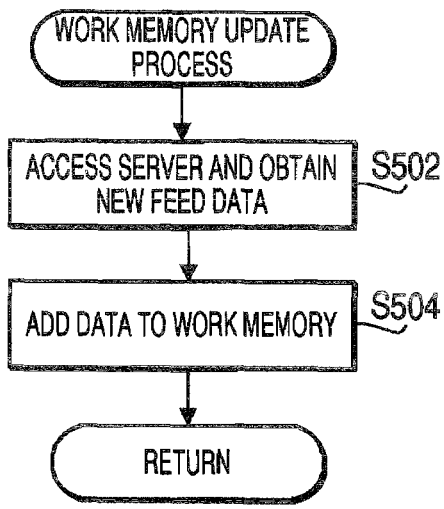

FIG. 14 is a work memory updating process executed by the MFD according to the aspects of the invention.

DETAILED DESCRIPTION OF THE EMBODIMENT

Hereinafter, referring to the accompanying drawings, an embodiment according to aspects of the invention will be described.

Figure 1:
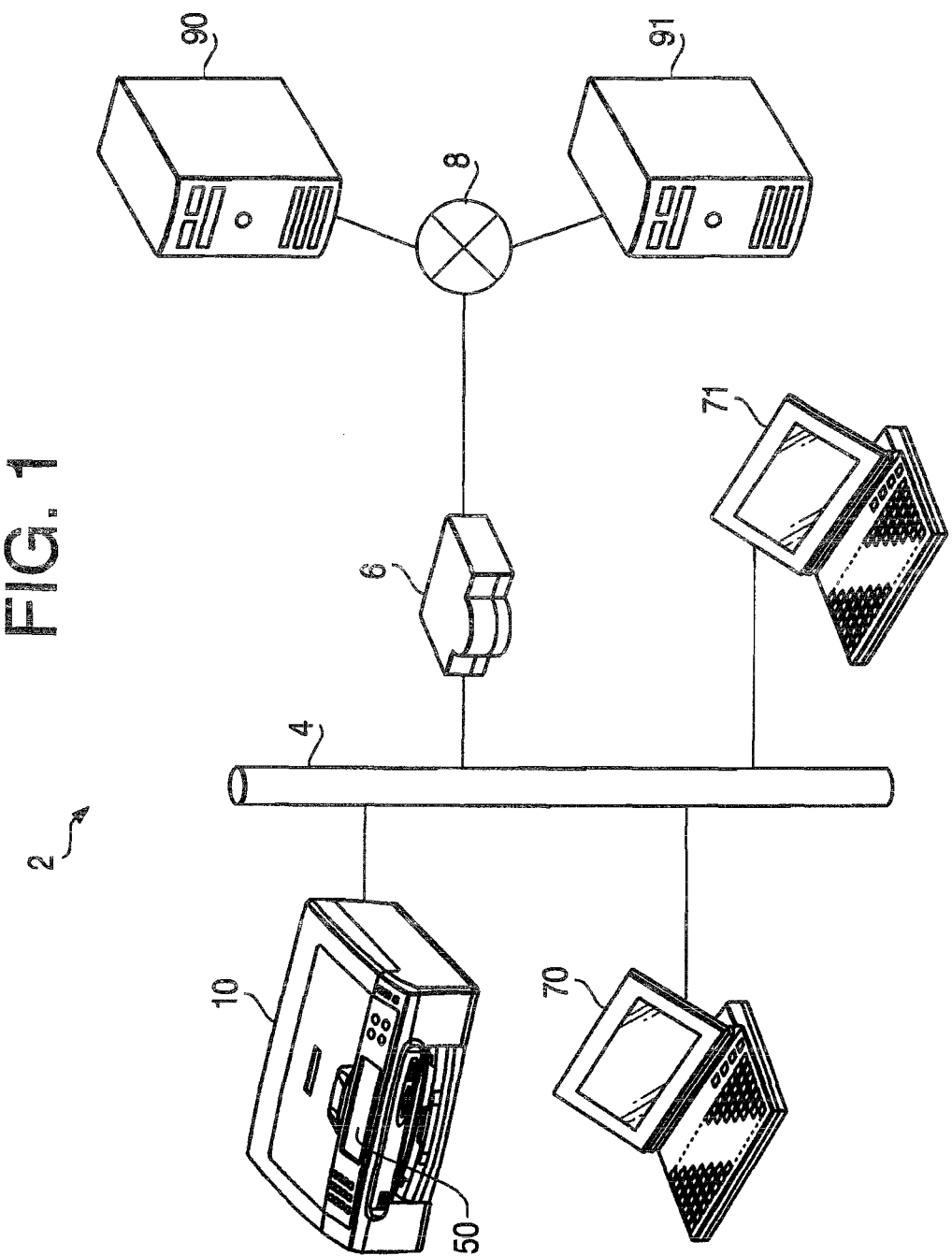

As shown in FIG. 1, a multifunction system 2 includes an MFD (multifunction device) 10, a plurality of PCs (personal computers) 70 and 71, a plurality of content supplying servers 90 and 91. The MFD 10 is connected to a LAN (local area network) 4. The PCs 70 and 71 are also connected to the LAN 4. The LAN 4 is connected to the Internet 8 through a router 6. Each of the content supplying servers 90 and 91 is also connected to the Internet 8. According to the exemplary embodiment, the content supplying server 90 lays open a web site, and the content supplying server 91 lays open another web site. Each web site includes a plurality of pieces of content. Further, the content supply servers 90 and 91 store feed data, which is the feed information in the form or RSS format, representing summaries of the plurality of pieces of content of the sites, respectively.

The MFD 10 has, as shown in a block diagram (FIG. 2), a control unit 12, a display panel 50, a keypad 52, a printer unit 54, a scanner unit 56, a facsimile unit 58, a network interface 60, a PSTN (Public Switched Telephone Network) interface 62. The control unit 12 includes a CPU (Central Processing Unit) 14, a ROM (Read Only Memory) 16, a RAM (Random Access Memory) 30 and an NVRAM (Non-Volatile RAM) 40.

The CPU 14 executes various processes in accordance with programs 18-26 stored in the ROM 16. A main program 18 is a program for controlling basic operations of the MFD 10. The main program 18 includes, for example, a program for generating display data to be displayed on the display unit 50. The main program 18 further includes programs for the printer unit 54, scanner unit 56 and the facsimile unit 58. An Internet connection program 20 is for connecting the MFD 10 to the Internet 8. A feed data analysis program 22 is for analyzing the feed data which the MFD 10 obtains from the content supply servers 90 and 91 and for generating data (hereinafter, referred to as display data) to be displayed on the display panel 50. The feed data display program 24 is for displaying the feed data. A PC management program 26 is for executing an operation in accordance with a PC boot notification that indicates start-up of the PC and is transmitted from the PC 70 and PC 71.

The display panel 50 is capable of displaying various kinds of information. An exemplary image of the display screen is shown in FIG. 11. In this example, a trash box button 212, a batch transmission button 214, and data display areas 200-204 are displayed on the display screen of the display unit 50. In the data display areas 200-204, titles 1-6 and descriptions 1-5 are displayed, respectively.

The RAM 30 has multiple storage areas 32-38. A main work area 32 is an area for storing data that is generated when the main program 18 is executed. A feed data analysis work area 34 is an area for storing data that is generated when the feed data analysis program 22 is executed. A display data storage area 36 is an area for storing display data that is generated by the feed data analysis program 22. A PC data storage area 38 is an area for storing data related to a PC from which the PC boot notification was transmitted.

The NVRAM 40 has storage areas 42-46. A main parameter storage area 42 is an area for storing parameters (e.g., print setting parameters, scan setting parameters, etc.) which are used when the CPU 14 executes the main program 18. The main parameter storage area 42 also stores coordinate data table 48, an example of which is shown in FIG. 3. In the example shown in FIG. 3, the coordinate table 48 has seven storage areas M0-M6 (which will be referred to as memory area numbers), each stores coordinates indicating a position on the display panel 50. Specifically, according to the exemplary embodiment, the storage areas M0-M4 store coordinates of the data display areas 200-205 (see FIG. 11), respectively. The storage area M5 stores coordinates representing the position of the trash button 212, and the storage area M6 stores the coordinates representing the position of the batch transmission button 214.

A URL storage area 44 is an area for storing URLs of the feed data the content supply servers 90 and 91 posses. For example, a user is required to register with the content supply system as a subscriber in order to acquire (receive) the content supply service from the content supplying servers 90 and 91. Such a registration may be done typically by using the MFD 10. Alternatively, the registration may be performed using the PC 70 or PC 71.

The network interface 60 is connected to the LAN 4. Thus, the MFD 10 is capable of communicating with the PCs 70 and 71. Further, the MFD 10 can connect to the Internet 8 via the LAN 4 and the router 6.

The URL storage area 44 is configured to store site URLs 102 of the feed data of the content servers 90 and 91. In other words, the URL storage area 44 stores the site URLs 102 of the feed data of each site. FIG. 4 shows an example of data stored in the URL storage area 44. In this example, n site URLs 102 are stored. Hereinafter, the number "n" of the stored URLs will be referred to as the number of the registered sites. For each site URL 102, an identification (ID) number 100 is assigned (see FIG. 3). In the following description, the ID number 100 will be represented by a symbol i. As shown in FIG. 4, for n site URLs, ID number 0 to (n−1) are assigned.

Figure 2:
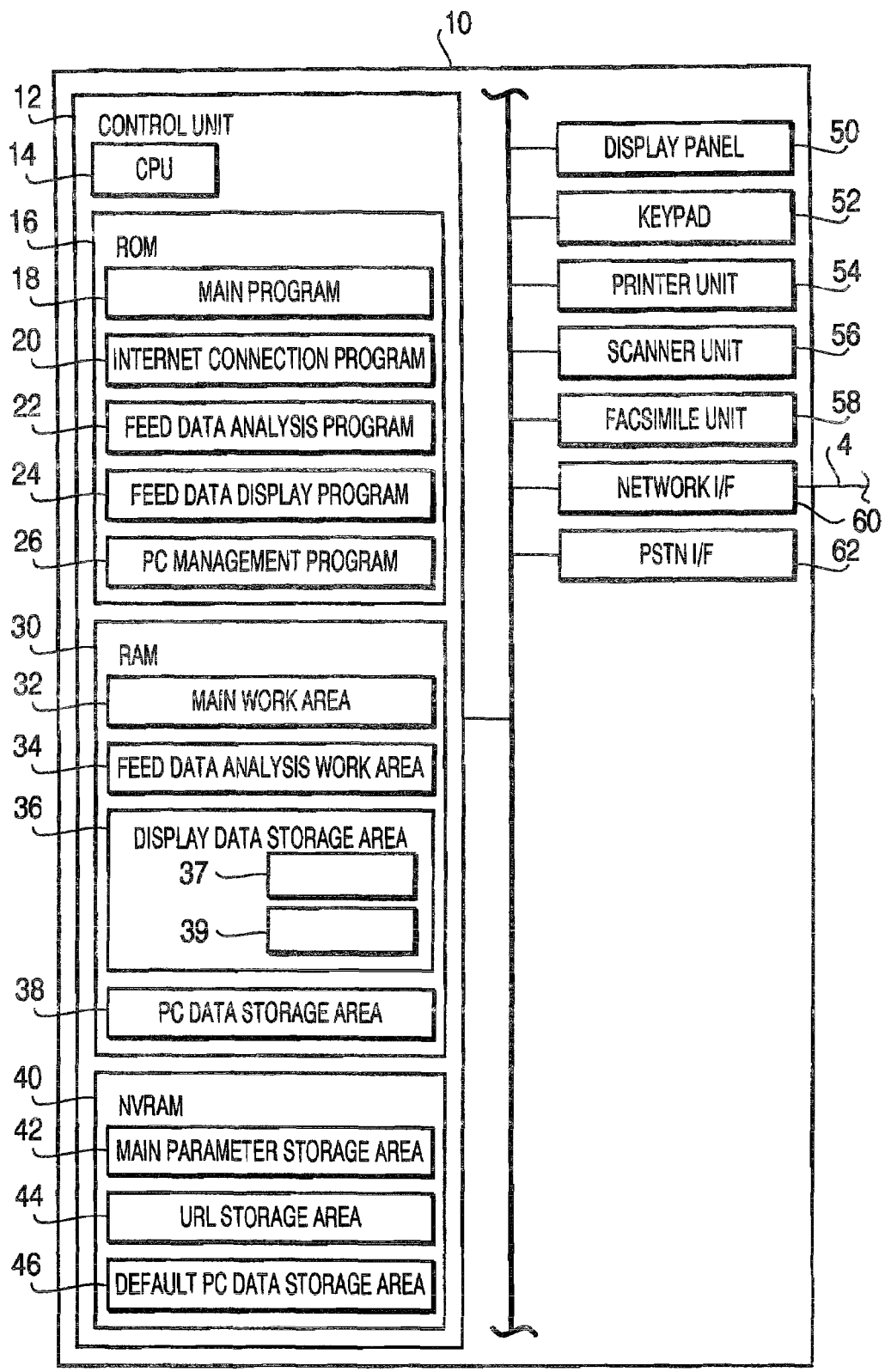
FIG. 2 is a block diagram showing a configuration of an MFD (multifunction device) employed in the multifunction system shown in FIG. 1.
Figure 5:
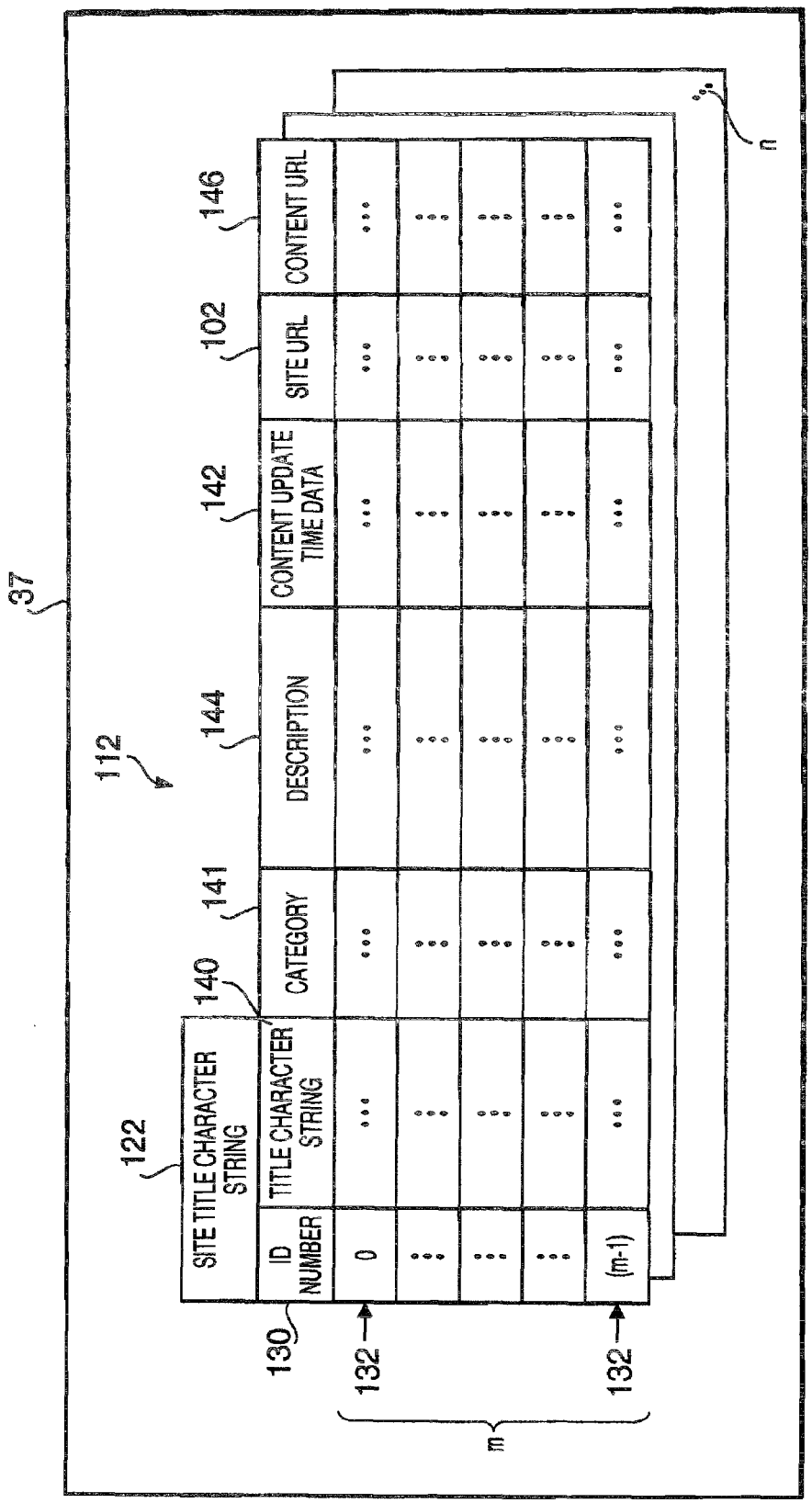
FIG. 5 shows an example of a data structure of a UC (updated content) memory according to aspects of the invention.

As shown in FIG. 2, the display data storage area 36 includes a UC (updated content) memory 37 and a work memory 39. The UC memory 37 stores updated content data 132 which is generated based on the feed data obtained from the content supplying servers 90 and 91. FIG. 5 schematically shows a data structure of the UC memory 37. The UC memory 37 can store display data 112 for each URL stored in the URL storage area 44. As described above, the URL storage area 44 stores n site URLs 102 (see FIG. 4). Therefore, the UC memory 37 also stores n pieces of display data 112.

As shown in FIG. 5, the display data 112 includes a site title character string 122, which represents the name of a site. The display data 112 includes m pieces of updated content data 132 (m being a natural number). Hereinafter, the number m is referred to the number of pieces of content registered. To each piece of the updated content data 132, an ID number 130 of which value is 0 to (m−1) will be sequentially assigned. The updated content data 132 is data that is created using the feed data such that at least part of the feed data is included. The updated content data 132 includes the content title character string 140, a category 141, a description 144, content updated time data 142, site URL 102 of each site corresponding to the feed data, and content URL 146.

The content title character string 140 represents a title (or a name) of the content. The category 141 is determined based on keywords when the data is acquired. Categorizing of the data will be descried later. The description 144 is generally the summary of the character strings included in the content. Therefore, the number of characters of the description 144 is greater than that of the title of the content but less than that of the content. The content update time data 142 represents the date/time of the latest update of the content at the content supplying servers 90 and 91. The site URL 102 represents the URLs of the feed data of the content supplying servers 90 and 91. The content URL 146 represents the URLs of respective pieces of content.

Figure 6:
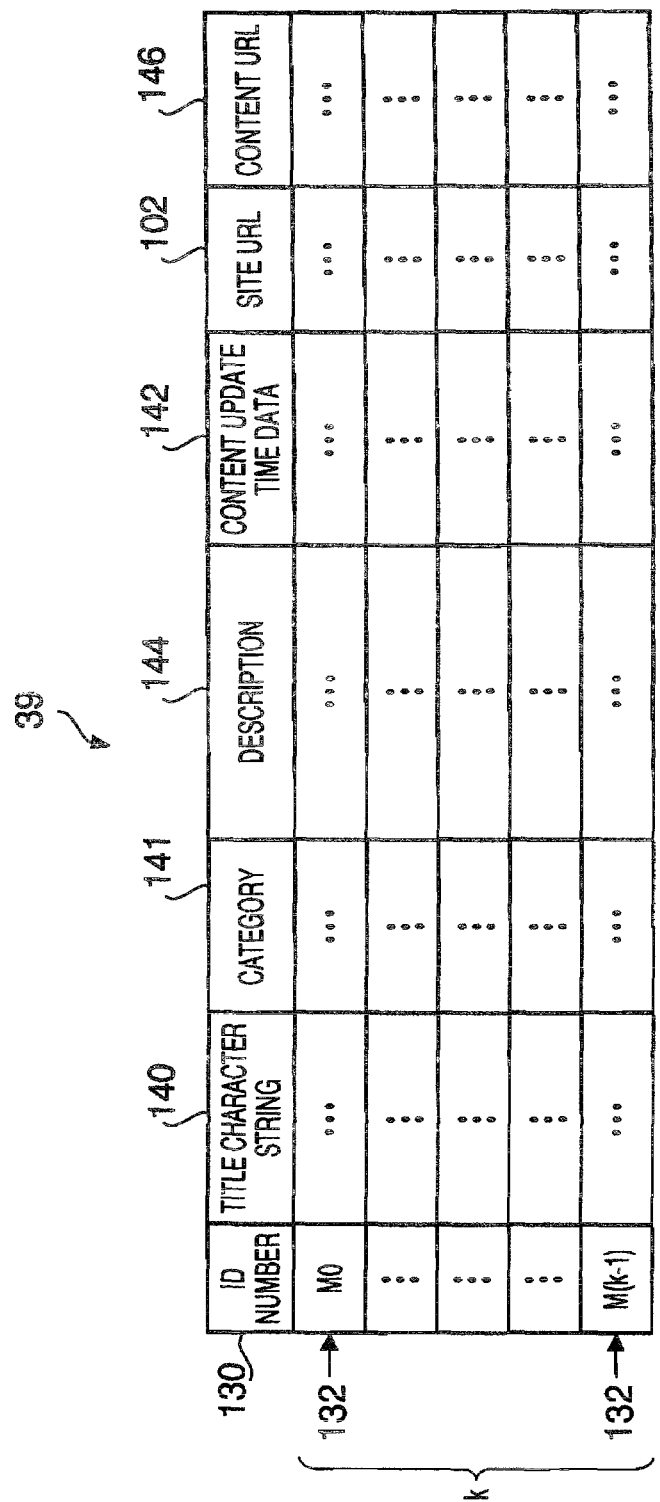
FIG. 6 shows an example of a data structure of a work memory according to aspects of the invention.

The work memory 39 is for storing updated content data 132 selected from the UC memory 37 which is to displayed on the display panel 50. As shown in FIG. 6, the work memory 39 is configured to store k pieces of updated content data 132 (k being a natural number). To the k pieces of updated content data 132, memory numbers M(0)-M(k−1) are assigned, respectively. The data structure of the work memory 39 is similar to that of the UC memory 37 and will not described in detail for brevity.

Figure 7:
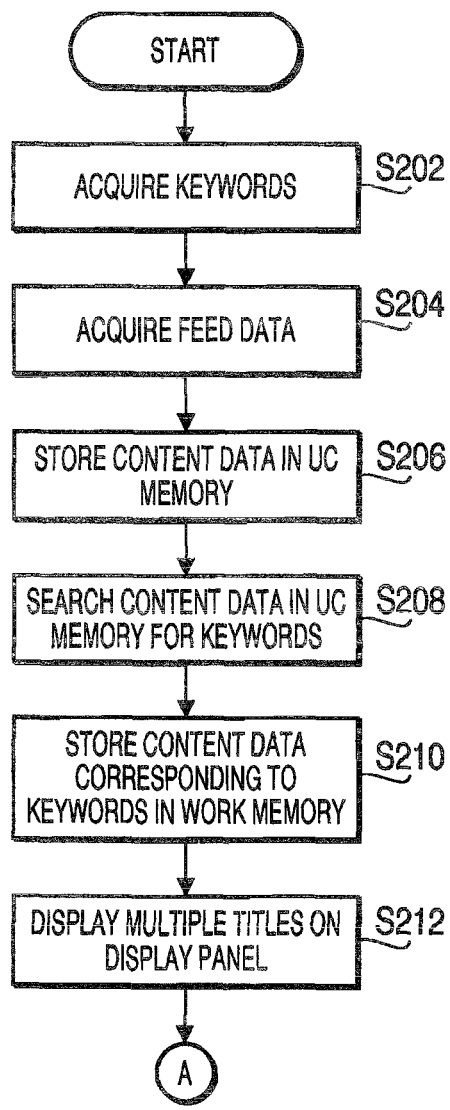
FIGS. 7 and 8 show a flowchart illustrating a display process executed by the MFD.

A display process will be described referring to a flowchart shown in FIGS. 7 and 8. In S202, the CPU 14 acquire browsing keywords and deletion keywords. As a keyword, the site URL 102 or the category 141 may be used. As shown in FIG. 9, the keyword using the site URL 102 includes "URL0"

(Asahi), "URL1" (Nikkei), and the like, and the keyword using the category 141 includes "SPORTS," "ECONOMY," and the like.

The browsing keyword is a keyword related to the content the user has browsed. In other words, the browsing keyword is one related to the content the user needs to browse. The deletion keyword is a keyword related to the content the user has deleted. In other words, the deletion keyword is one related to the content the user does not need. The browsing keyword and/or the deletion keyword are acquired in S312 or S316, which will be described later.

Optionally, such keywords (i.e., browsing keywords and/or deletion keywords) may be accumulated in the main parameter storage area 42 of the NVRAM 40. Alternatively, instead of storing the keywords, browsing information in the past may be stored. The browsing information in the past may include data transmitted by the PC or deleted by the PC. In such a configuration, the keywords may be obtained from the browsing information in the past.

In S204, the CPU 14 accesses the n sites subsequently and obtains the feed data from each site. The feed data includes the site title character string 122, content title character string 140 and the like, as shown in FIG. 5. Based on the thus acquired feed data, the CPU 14 generates the updated content data 132.

When the updated content data 132 is generated as above, the CPU 14 categorizes the generated updated content data 132. Specifically, the CPU 14 picks up words from the description 144 included in the updated content data 132, and assigns one of the categories such as "SPORTS," "ECONOMY," "SOCIAL," "POLITICS, "GLOBAL" and the like to each piece of the content data 132 based on the picked up words. For example, when a word "BASEBALL" is picked up from the updated content data 132, the CPU 14 assigns the category of "SPORTS" to the updated content data 132 from which the category "BASEBALL" is derived.

In S206, the CPU 14 stores the updated content data 132, which is generated based on the feed data acquired from a site, in the UC memory 37. An example of the data structure in the UC memory 37 when the number m of the registered pieces of content is five is shown in FIG. 9. In the display data 112 corresponding to the ID number 100 of "0" (zero), the site title character string is "Asahi" and the site URL 102 is "URL0." It should be noted that the ID number 100 referred to herein is the ID number shown in FIG. 4. In the display data 112 corresponding to the ID number 100 of "1" (one), the site title character string is "Nikkei" and the site URL 102 is "URL1." In the display data 112 corresponding to the ID number 100 of "2" (two), the site title character string is "Chunichi" and the site URL 102 is "URL2."

In S208, the CPU 14 searches the UC memory 37 for the updated content data 132 that meets the keywords.

When the site URL 102 is used to execute the searching, firstly, among the acquired browsing keywords (which represent site URLs), the URL the number of which is the largest is selected, and the updated content data 132 that meets the thus selected site URL 102 is searched. Further, the updated content data 132 that meets the site URLs which are acquired as the deletion keyword are excluded when the search is executed. For example, if "URL0" is the site URL 102 the number of which is the largest among the site URLs 102 acquired as the browsing keywords, the updated content data 132 obtained from the content supply server of the "URL0" (Asahi) is searched.

When the category is used to execute the searching, firstly, among the acquired browsing keywords (i.e., SPORTS, ECONOMY, etc.), the category the number of which is the largest is selected, and the updated content data 132 that meets the thus selected category is searched. Further, the updated content data 132 that meets the category which are acquired as the deletion keyword are excluded when the search is executed. For example, if "SPORTS" is the category the number of which is the largest among the acquired browsing keywords, the updated content data 132 that meets the category of "SPORTS" is searched.

It should be noted that the site URL 102 or category the number of which is the largest can be defined appropriately in accordance with the usage of the MFD 10. For example, the site URL 102 or category which has been browsed more than twice after the MFD 10 was powered on may be defined as the site URL 102 or the category having the largest number. In such a configuration, if the MFD 10 is used such that it is only powered on when used (when used as a printer), the site URL 102 or the category having the largest number can be determined appropriately. Alternatively, the site URL or category which has browsed ten times or more may be treated as the site URL or the category having the largest number. In such a configuration, if the MFD 10 is used such that it is always powered on (when used as a facsimile machine), the site URL 102 or the category having the largest number can be determined appropriately.

Which of the site URL 102 or category is used for the keyword may be determined in accordance with a user's browsing tendency/condition. For example, if the user usually performs a search using the category keywords, and a specific category is referred to exceeding a predetermined ratio (e.g., 50%), then it is regarded that the user tends to browse the content of the specific category. In such a case, the search based on the category may be prioritized. On the contrary, if none of the category is searched exceeding a predetermined ratio, that is, if the user tends to browse the content of various categories almost evenly, the search based on the site URL 102 may be prioritized. With such a configuration, the search can be made appropriately.

In S210, the CPU 14 selects the updated content data 132 that meets the keywords, and stores the selected pieces of content data in the work memory 39. Specifically, the CPU 14 selects the updated content data 132 acquired from the content supplying server corresponding to the browsing keyword (e.g., the site URL 102) as acquired from among the updated content data stored in the UC memory 37, and stores the thus selected updated content data in the work memory 39. It is noted that, among the data stored in the UC memory 37, the updated contents data 132 based on the feed data acquired from the content supplying server corresponding to the acquired deletion keywords (e.g., the site URL 102) will not be selected (i.e., will not be copied to the work memory 39).

When the keywords are of the category, the search is executed as follows. The CPU 14 selects, from among the data stored in the UC memory 37, the updated content data 132 of the categories that meet the categories of the acquired browsing keywords, and stores the selected pieces content in the work memory 39. The updated content data 132 which is stored in the UC memory 37 and is of the same category as the acquired deletion keyword is not selected.

Data stored in the work memory 39 when the keywords refer to the site URL 102, "URL0" and "URL1" are acquired as the browsing keywords and "URL2" is acquired as the deletion keyword will be described referring to FIGS. 9 and 10 as an exemplary case.

As shown in FIG. 10, a plurality of pieces of the updated content data 132 acquired from the content supplying servers that meet the browsing keywords (i.e., "URL0" and "URL1") are selected from the UC memory 37 and stored in the work memory 39. As described above, the updated content data 132 based on the feed data acquired from the content supplying server that meets the deletion keyword (i.e., "URL2") is not stored in the work memory 39.

In S212 (FIG. 7), the CPU 14 displays a plurality of titles on the display panel 50 based on the data stored in the work memory 39. As a result, as shown in FIG. 11, titles 1-5 and corresponding descriptions 1-5 are displayed in the data display areas 200-204.

Figure 8:
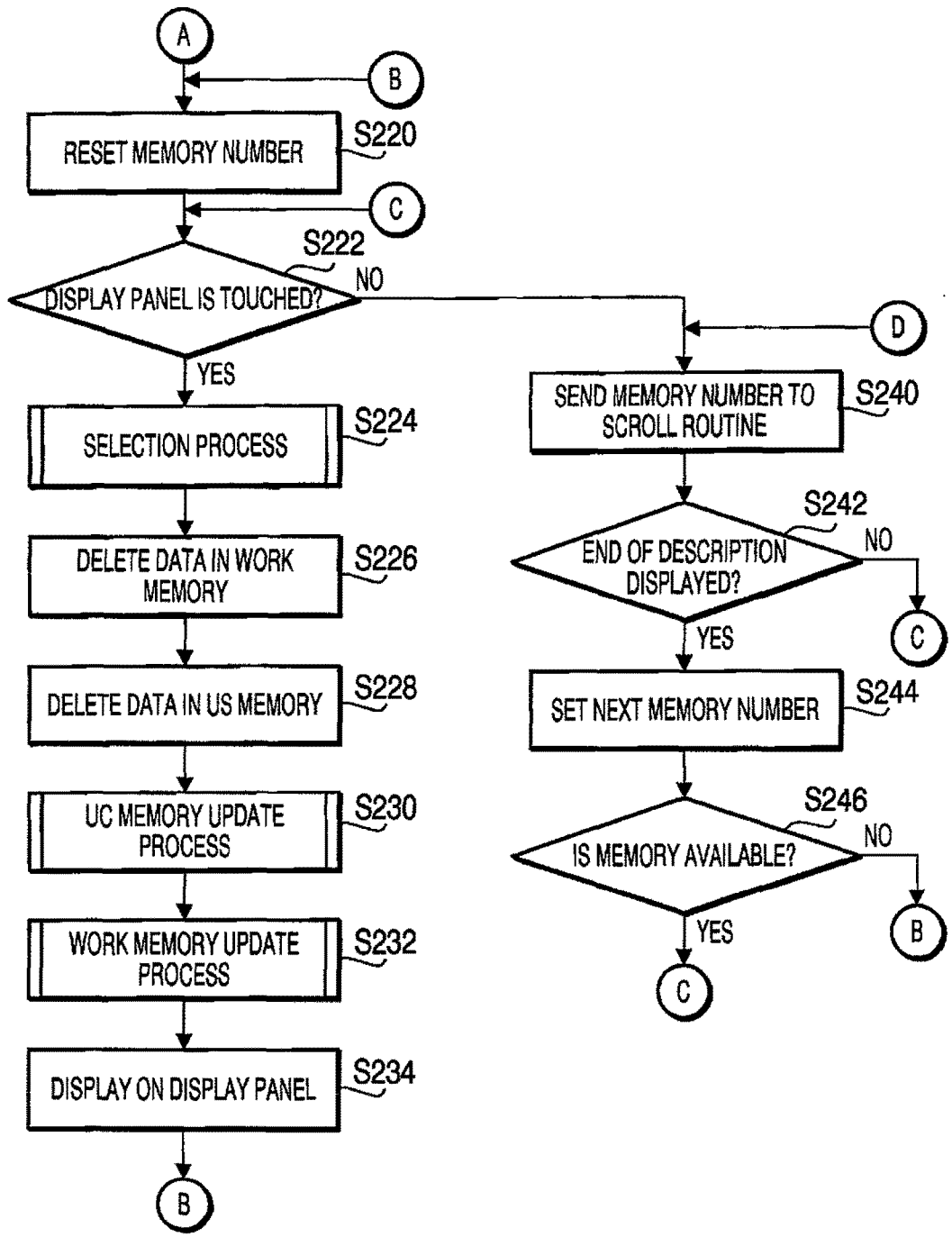

Next, the CPU 14 resets the setting memory number, which is stored in the feed data analysis work area 34, to "M0" (i.e., the coordinates of the data display area 200 in FIG. 11) in S220 (FIG. 8). The setting memory number is for identifying one of the multiple data display areas 200-204 as the data display area subjected to a scroll with a scrolling process described later.

Thereafter, the CPU 14 judges whether the user touches the display panel 50 (S222). If the user touches the display panel 50 (S222: YES), the CPU 14 executes a selection process (S224), which is illustrated in FIG. 12.

In S302 (FIG. 12), the CPU 14 detects the coordinates of the position on the display panel 50 where the user's finger touches. Then, the CPU 14 judges whether the detected coordinates coincide with the coordinates of one of the data display areas 200-204 where the titles are displayed (S304). This decision is made by comparing the detected coordinates with the coordinates corresponding to the memory numbers M0-M4 in the coordinate data table 48 shown in FIG. 3. If the detected coordinates coincide with one of the coordinates corresponding to the memory numbers M0-M4 (S304: YES), the user's finger touches one of the data display areas 200-204 and the CPU 14 proceeds to S306.

In S306, the CPU 14 identifies the memory number based on the detected coordinates. Specifically, the CPU 14 determines which of the memory numbers M0-M4 corresponds to the coordinates that coincide with the detected coordinates. Then, the CPU 14 judges whether the title is clicked (S308). The "click" in the embodiment refers to an operation of touching a surface of the display panel 50 with a finger once within a short period.

When the title is clicked (S308: YES), the CPU transfers the content corresponding to the clicked data display area to the PC 70 and/or PC 71. For example, when the data display area 201 (FIG. 11) has been clicked, the CPU 14 identifies that the memory number is M1 (see FIG. 3). Then, the CPU 14 transfers the content URL 146 corresponding to the thus identified memory number M1 to the PC 70 and/or PC 71. Then, the PC 70 or the PC 71 downloads the content from the content supplying server in accordance with the transferred content URL 146. With this configuration, at the PC 70 or PC 71, which has a display unit having a larger area than the display panel 50, the selected content can be displayed.

In S312, the CPU 14 acquires the browsing keywords. In this embodiment, the browsing keywords are related to the category 141 and the site URL 102. For example, if the memory number M1 is selected in FIG. 10, the category of "SPORTS" and the site URL 10 of "URL0" are acquired as the browsing keywords.

If the title is not clicked (S308: NO), the CPU 14 judges whether a deletion operation is performed with respect to the titles (S314). The deletion operation is an operation to drag and drop the title displayed in one of the data display areas 200-204 on the trash box button 212. If the deletion operation has not been executed (S314: NO), the CPU 14 proceeds to S240 (FIG. 8). If the deletion operation has been performed (S314: YES), the CPU proceeds to S316.

In S316, the CPU 14 acquires deletion keywords. According to the embodiment, the deletion keywords relate to the category 141 and/or the site URL 102. For example, if the updated content data 132 corresponding to the memory number M1 is deleted (see FIG. 10), the category of "SPORTS" and the site URL 102 of "URL0" are acquired as the deletion keywords.

If the detected coordinates do not coincide with any one of the coordinates of the data display areas 200-204 (S304: NO), the CPU 14 proceeds to S318. In S318, the CPU 14 judges whether the detected coordinates coincide with the coordinates of the batch transmission button 214, referring to the memory number M6 of the coordinate data table 48. According to the embodiment, the batch transmission button 214 is for a button to transmit all the updated content data 132 stored in the work memory 39 to the PC 70 and/or PC 71. If the detected coordinates coincide with the coordinates of the batch transmission button (S318: YES), the CPU 14 proceeds to S320 to execute the batch transmission. Otherwise (S318: No), the CPU 14 returns to S240 (FIG. 8).

In S226 (FIG. 8), the CPU 14 deletes, from the work memory 39, the updated content data 132 transmitted to the PC in S224, or the updated content data 132 corresponding to the deleted content. In the example of FIG. 10, the updated content data 132 corresponding to the memory number M1 is deleted from the work memory 39.

In S228, the CPU 14 deletes, from the UC memory 37, the updated content data 132 which is the same as the updated content data 132 having been deleted from the work memory 39. In the example shown in FIG. 9, the updated content data of which the ID number (130) is "0" and ID number is "1" will be deleted from the UC memory 37.

In S230, the UC memory update process, which is illustrated in FIG. 13, is executed. When the UC memory update process is started, in S402, the CPU 14 accesses the updated content data supplying server 90 to acquire new feed data, and generates the updated content data 132 based on the thus acquired feed data. When the new updated content data 132 is generated, the CPU 14 assigns the category 141 to the updated content data 132.

According to the embodiment, the new feed data is acquired using the keywords. As an example, a case where the site URL 102 is used as the keyword will be described. The CPU 14 acquires the feed data from the content supplying server the meets the site URL 102 of which the number is the largest among the URLs acquired as the browsing keywords. Then, the CPU 14 proceeds to S404, where the CPU 14 adds the updated content data 132 that has been generated based on the feed data, into the UC memory 37.

As another example, a case where the category is used as the keyword will be described. In this case, the CPU 14 acquires the feed data from the content supplying server, extracts the category from the acquired feed data, selects the feed data that meets the browsing keywords (i.e., in the same category) and proceeds to S404.

In S404, the CPU 14 adds the updated content data 132 which has been generated based on the feed data selected as the data to be stored into the UC memory 37.

Which of the site URL 102 or the category is used as the keywords may be determined in accordance with the user's browsing tendency or the like. The determination is similar to that described above and will not be repeated for brevity.

As described above, according to the embodiment, the feed data is appropriately selected, and only the necessary updates content data 132 is generated and stored in the UC memory 37. Therefore, the user can access a desired article data easily.

In S230 (FIG. 8), when the US memory update process is finished, the CPU 14 proceeds to S232, where the work memory update process is executed.

When the work memory update process is started, in S502 (FIG. 14), the CPU 14 accesses the UC memory 37 to obtain the new updated contents data 132. The new updated content data 132 is obtained using the keywords.

When the site URL 102 is used as the keywords, the CPU 14 selects the site URL of which the number is the largest among the site URLs obtained as the browsing keywords, and the updated content data 132 based on the display data 112 corresponding to the thus selected site URL is obtained. Further, the CPU 14 prohibits the access to the display data 112 including the site URLs which are obtained as the deletion keywords.

When the category is used as the keywords, the CPU 14 obtains the updated content 132 falling in the same category as the category obtained as the browsing keywords. Further, the updated content data 132 of the categories which are the same as the categories obtained as the deletion keywords is excluded when the updated content data 132 is obtained.

In S504, the CPU 14 adds the obtained updated content data 132 to the work memory 39.

In S232 (FIG. 8), when the work memory update process is finished, the CPU 14 proceeds to S234, where the CPU 14 causes the display panel 50 to display multiple titles based on the data stored in the updated work memory 39. Since the data stored in the work memory 39 has been updated, the titles of the new updated content data 132 are displayed instead of the title of the updated content data 132 transmitted to the PC and the deleted updated content data 132.

If the user's finger has not touched the display panel 50 (S222: NO), the CPU 14 proceeds to S240, where the CPU 14 sends the setting memory number to the scroll routine. According to the embodiment, the scroll routine is for executing a scroll of the data display area designated by the setting memory number during a period in which the user's finger is not touched to the display panel 50. The scroll routine is executed by the feed data display program 24. It should be noted that, once the user touches one of the display areas 200-204 of the display panel 50 (S222: YES), the CPU 14 executes steps S224-S234. Thereafter, after the CPU 14 returns to S220 and if the user does not touch the display panel 50 (S222: NO), the CPU 14 proceeds to S240 to execute the scroll routine. As a result, description of the updated content data 132 selected by the user is scrolled.

In S242, the CPU 14 judges whether all the text of the description subject to the scroll display in the data display area has been displayed. If the description has not been displayed (scrolled) to the end thereof (S242: NO), the CPU 14 returns to S222. When the all the text of the description has been displayed (S242: YES), the CPU 14 proceeds to S244.

In S244, the CPU 14 increments the setting memory number by one (i.e., the next setting memory number is set). In S246, the CPU 14 refers to the coordinate data table 48 (FIG. 3) and judges whether the memory number equal to the currently set setting memory number and storing the coordinates of a data display area exists in the coordinate data table 48. If such a memory number exists (S246: YES), the CPU 14 returns to S222. Thus, for the data display area corresponding to the incremented setting memory number, the description is scrolled as described above. Therefore, for example, if the description corresponding to the memory number M1 has been finished, the scroll display of the description corresponding to the memory number M2 (i.e., scroll of the description in the data display area 202) is started. When there does not exist the memory number (S246: NO), the scroll display of the description in the lowermost data display area has been completed. In such a case, the CPU 14 returns to S220. Then, the setting memory number is reset to M0, and the scroll display in the uppermost data display area (i.e., in data display area 200) is started.

With the above control, when the user's finger does not touch the display panel 50, the scroll display of the description in the data display areas is executed subsequently from the top area to the lower area. Further, when the scroll display of the description of the lowermost data display area is finished, the scroll display in the uppermost data display area is executed. Thus, for the data display areas, the scroll display of the description is executed cyclically.

According to the embodiment described above, the description 144 of the updated content data 132 is scrolled on the display panel 50. Therefore, even if the display panel 50 has a relatively small area for display the description, all the text of the description 144 can be displayed. Therefore, the user can grasp what is included in each of the plurality of pieces of content.

When the display panel 50 of the MFD 10 is not sufficiently large and it is difficult for the user to view the entire content, the URL of the content can be transmitted from the MFD 10 to the PC 70 or PC 71. Therefore, the user can conveniently view the entire content on the display device of the PC 70 or PC 71.

If the user views the description 144 and judges that the content is unnecessary, the user can delete the content referring to the list display on the display panel 50. Therefore, the user can cause the MFD to display only the necessary pieces of content in a list, and the user can access the desired piece of content easily.

According to the embodiment, the plurality of pieces of content of which URLs are transmitted to the PC 70 or PC 71 are considered to be important for the user. Therefore, the keywords derived from such content can be regarded to represent the content important for the user. According to the embodiment, using the keywords, updated content data 132 is selected from the UC memory 37 and stored in the work memory 39. With this configuration, different from a case where new updated content data is randomly stored in the work memory 39, only the data required by the user can be stored in the work memory 39. Therefore, only the pieces of content necessary for the user can be displayed on the display panel 50 in a list, which allows the user to access the desired pieces of content easily.

The above-described embodiment is only an exemplary one and the invention needs not be limited to the configuration described above. Rather, the embodiment described above may be modified in various ways without departing from the scope of the invention, and examples of such modifications will be described hereafter.

In the exemplary embodiment, the keywords are acquired from the data transmitted to the PC and/or deleted data. However, the data acquisition need not be limited to that of the embodiment, but may be achieved in various ways. For example, the keywords may be derived from print data which is transmitted to the MFD 10 from, for example, the PC 70 and/or PC 71. When the MFD 10 receives the print data, the CPU 14 executes the print job using the printer unit 54. It is apparent that the print data includes data necessary for the user, the browsing keywords can be derived from the print data.

In the exemplary embodiment, the site URL 102 is used as the keywords, this configuration may be modified. As the keywords, any information usable to identify a content supplying server. Therefore, instead of the site URL, a site title character string (e.g., "Asahi") can be used as the keyword.

In the exemplary embodiment, the content corresponding to the clicked data display areas are transmitted to the PC 70 or PC 71 (in S310). This configuration may be modified such that the content corresponding to the clicked data display areas may be displayed on the display panel 50.

The exemplary embodiment described above may be modified such that, when the feed data is obtained in S204, selection of the feed data may be performed using the keywords as is don in S402 of the UC memory update process (FIG. 13). When the site URL 102 is used as the browsing keywords, the feed data is obtained from the content supplying servers that meet the designated site URL 102. When the category is used for the keywords, the CPU 14 may obtain the feed data from the content supplying servers, derives the categories from the obtained feed data, and stores the updated content data 132 that is generated based on the feed data of the same categories as the browsing keywords. Optionally or Alternatively, the acquisition of the feed data (S204) may be restricted using the deletion keywords. When the site URL 102 is used as the deletion keywords, access to the content supplying servers that meet such a URL (i.e., the deletion keyword) may be inhibited. When the category is used for the keywords, the CPU 14 may obtain the feed data from the content supplying servers and derived the categories from the obtained feed data. Then, the feed data of the categories that are same as the deletion keywords are excluded from the data to be stored in the UC memory 37.

With the above modification, only the necessary updated content data 132 can be selected and stored in the UC memory 37. In such a case, it becomes possible to simply copying the updated content data stored in the UC memory 37 to the work memory 39. Therefore, in the display process (FIG. 7), step S208 for searching the updated content data 132 that meets the keywords, and step 210 for selecting the updated content data 132 that meet the keywords from the UC memory 37 and storing the selected updated content data 132 to the work memory 39 can be omitted.

According to the exemplary embodiment, when the new updated content data 132 is obtained in S402, the browsing keywords are used to select the feed data. Such a configuration may be modified such that the acquisition of the feed data may be restricted using the deletion data as the keywords. When the site URL 102 is used as the deletion keywords, access to the content supplying servers that meet the site URL 102 is inhibited. Therefore, from the sites same as the sources of the feed data, the feed data cannot be obtained. When the category is used as the deletion keywords, the CPU 14 obtains the feed data from the content supplying servers, devised the categories from the obtained feed data, and deletes the feed data that meet the deletion keywords (i.e., the categories) from the data to be stored. Therefore, the updated content data 132 of the categories that are same as the categories of the deleted updated content data 132 will not be obtained. With such a configuration, only the necessary feed data can be acquired, and the user can access the desired data easily.

A backup area for duplicating the data stored in the UC memory 37 may be provided in the NVRAM 40, and CPU 14 may copy the data stored in the UC memory 37 every time the data of the UC memory 37 is updated and/or periodically. Then, the CPU 14 may be configured to copy the data stored in the backup area to the UC memory 37 when the MFD 10 is powered on. According to such a configuration, even if the MFD 10 is powered off, the CPU 14 can use the data stored in the backup area when the MFD 10 is powered on next time. Therefore, immediately after the MFD 10 is powered on, the data that was displayed on the display panel 50 can be displayed, which improves the operability of the MFD 10.

What is claimed is:

1. A communication device configured to access, based on summary location data, content summary data, which includes at least titles of a plurality of pieces of content, location data representing locations of the plurality of pieces of content and description data representing a part of each of the plurality of pieces of content, the communication device comprising:
a first memory;
a first storage control unit configured to obtain a plurality of pieces of content summary data based on the summary location data, generate a plurality of pieces of storing summary data based on the plurality of pieces of content summary data so as to include at least part of the respective pieces of content summary data, and store the plurality of pieces of storing summary data in the first memory;
a second memory;
a second storage control unit configured to select a predetermined number of pieces of storing summary data from among the plurality of pieces of storing summary data stored in the first memory and store the selected predetermined number of pieces of storing summary data in the second memory;
a first display unit configured to display, in a plurality of scroll areas, the titles and corresponding description data of the predetermined number of pieces of storing summary data stored in the second memory in a list, and execute a scroll display of the description data corresponding to the displayed titles, sequentially, on the list in display order by automatically changing a scrolling area where the description data is being scrolled, from one to another sequentially, the description data being scrolled and further automatically changing from one area to another area sequentially among the plurality of scroll areas where the description data is to be scrolled, the scroll areas of the plurality of scroll areas that correspond to description data that is not being scrolled displayed, display the description data without being scrolled, the description data being scrolled in a horizontal direction and wherein the scrolling areas are arranged in a vertical direction and the scrolling areas are switched in the vertical direction, wherein when scrolling, in the horizontal direction, of only a certain line is finished, scrolling, in the horizontal direction, of only a next line in the vertical direction, is automatically started; and
a transmission unit configured to transmit the content location data included in the storing summary data corresponding to a selected title to a data display device that is communicably connected with the communication device.

2. The communication device according to claim 1, further comprising a deletion unit configured to acquire a user operation to select one of the title in the list displayed on the first display unit and delete the storing summary data corresponding to the selected title from the second memory.

3. The communication device according to claim 2,
further comprising a keyword obtaining unit configured to obtain a keyword based on the storing summary data of which the content location data is transmitted by the transmission unit,
wherein the second storage control unit selects storing summary data corresponding to the keyword from the first memory and store the selected storing summary data in the second memory in place of the storing summary data of which the content location data has been transmitted to the data display device and/or the storing summary data deleted by the deletion unit.

4. The communication device according to claim 3, wherein the keyword contains the summary location data, and
wherein the second storage control unit determines that two pieces of storing summary data of the same summary location data are related to each other, while two pieces of storing summary data of different summary location data are unrelated to each other.

5. The communication device according to claim 3, further comprising a categorizing unit configured to assign category data to each piece of the storing summary data based on the keyword,
wherein the keyword is the category data, and
wherein the second storage control unit determines that two pieces of storing summary data of the same category data are related to each other, while two pieces of storing summary data of different category data are unrelated from each other.

6. The communication device according to claim 2, further comprising a keyword obtaining unit configured to obtain a keyword based on the storing summary data deleted by the deletion unit,
wherein the second storage control unit selects storing summary data that does is not related to the keyword from the first memory and store the selected storing summary data in the second memory in place of the storing summary data of which the content location data has been transmitted to the data display device and/or the storing summary data deleted by the deletion unit.

7. The communication device according to claim 6, wherein the keyword contains the summary location data, and
wherein the second storage control unit determines that two pieces of storing summary data of the same summary location data are related to each other, while two pieces of storing summary data of different summary location data are unrelated to each other.

8. The communication device according to claim 6, further comprising a categorizing unit configured to assign category data to each piece of the storing summary data based on the keyword,
wherein the keyword is the category data, and
wherein the second storage control unit determines that two pieces of storing summary data of the same category data are related to each other, while two pieces of storing summary data of different category data are unrelated from each other.

9. The communication device according to claim 2, further comprising:
a printer unit configured to print out print data transmitted from the data display device; and
a keyword obtaining unit configured to obtain a keyword based on the print data,
wherein the second storage control unit selects storing summary data corresponding to the keyword from the first memory and store the selected storing summary data in the second memory in place of the storing summary data of which the content location data has been transmitted to the data display device and/or the storing summary data deleted by the deletion unit.

10. The communication device according to claim 2, further comprising a keyword obtaining unit configured to obtain a keyword based on the storing summary data of which the content location data is transmitted by the transmission unit,
wherein the first storage control unit obtains the content summary data related to the keyword, generates the storing summary data, selects storing summary data and stores the storing summary data in the second memory in place of the storing summary data of which the content location data has been transmitted to the data display device and/or the storing summary data deleted by the deletion unit.

11. The communication device according to claim 2, further comprising a keyword obtaining unit configured to obtain a keyword based on the storing summary data deleted by the deletion unit,
wherein the first storage control unit obtains the content summary data unrelated to the keyword, generates the storing summary data, selects storing summary data and stores the storing summary data in the second memory in place of the storing summary data of which the content location data has been transmitted to the data display device and/or the storing summary data deleted by the deletion unit.

12. The communication device according to claim 2, further comprising:
a printer unit configured to print out print data transmitted from the data display device; and
a keyword obtaining unit configured to obtain a keyword based on the print data,
wherein the first storage control unit obtains the content summary data related to the keyword, generates the storing summary data, selects storing summary data and stores the storing summary data in the second memory in place of the storing summary data of which the content location data has been transmitted to the data display device and/or the storing summary data deleted by the deletion unit.

* * * * *